United States Patent
Kaljurand

(10) Patent No.: US 10,706,210 B2
(45) Date of Patent: Jul. 7, 2020

(54) USER INTERFACE FOR DICTATION APPLICATION EMPLOYING AUTOMATIC SPEECH RECOGNITION

(71) Applicant: Nuance Communications, Inc., Burlington, MA (US)

(72) Inventor: Kaarel Kaljurand, Vienna (AT)

(73) Assignee: Nuance Communications, Inc., Burlington, MA (US)

( * ) Notice: Subject to any disclaimer, the term of this patent is extended or adjusted under 35 U.S.C. 154(b) by 330 days.

(21) Appl. No.: 15/252,704

(22) Filed: Aug. 31, 2016

(65) Prior Publication Data

US 2018/0060282 A1    Mar. 1, 2018

(51) Int. Cl.
| | | |
|---|---|---|
| *G06F 40/103* | (2020.01) | |
| *G06F 40/284* | (2020.01) | |
| *G10L 15/26* | (2006.01) | |
| *G06F 3/16* | (2006.01) | |
| *G10L 15/22* | (2006.01) | |

(52) U.S. Cl.
CPC .......... *G06F 40/103* (2020.01); *G06F 40/284* (2020.01); *G10L 15/26* (2013.01); *G06F 3/167* (2013.01); *G10L 2015/225* (2013.01)

(58) Field of Classification Search
None
See application file for complete search history.

(56) References Cited

U.S. PATENT DOCUMENTS

| | | | | |
|---|---|---|---|---|
| 5,231,670 A | * | 7/1993 | Goldhor | G06F 3/16 704/275 |
| 5,444,768 A | * | 8/1995 | Lemaire | H04M 1/6505 379/68 |
| 5,615,296 A | * | 3/1997 | Stanford | G10L 15/22 704/270.1 |
| 5,754,972 A | * | 5/1998 | Baker | G10L 15/04 704/2 |
| 5,761,687 A | * | 6/1998 | Hon | G06F 40/232 715/271 |

(Continued)

FOREIGN PATENT DOCUMENTS

| | | |
|---|---|---|
| WO | WO 2005/038777 A1 | 4/2005 |
| WO | WO 2010/000321 A1 | 1/2010 |
| WO | WO 2016/013685 A1 | 1/2016 |

OTHER PUBLICATIONS

International Search Report and Written Opinion for International Application No. PCT/US2017/049117 dated Dec. 1, 2017.

(Continued)

*Primary Examiner* — Marcus T Riley
(74) *Attorney, Agent, or Firm* — Wolf, Greenfield & Sacks, P.C.

(57) ABSTRACT

In an automatic speech recognition (ASR) dictation application, a user interface may be provided for informing a user how to dictate desired text. Input may be received from the user of the dictation application, specifying a desired text sequence. In response to the received input, output may automatically be provided to the user via the user interface, indicating one or more speech sequences that, when spoken by a user and recognized by the dictation application using ASR, would cause the dictation application to output the desired text sequence as a recognition result.

18 Claims, 7 Drawing Sheets

(56) References Cited

U.S. PATENT DOCUMENTS

| | | | | |
|---|---|---|---|---|
| 5,799,273 | A * | 8/1998 | Mitchell | G06F 3/167 |
| | | | | 704/235 |
| 5,857,099 | A * | 1/1999 | Mitchell | G10L 15/22 |
| | | | | 704/235 |
| 5,933,804 | A * | 8/1999 | Huang | G10L 15/063 |
| | | | | 704/244 |
| 6,064,965 | A * | 5/2000 | Hanson | G10L 13/04 |
| | | | | 704/235 |
| 6,100,882 | A * | 8/2000 | Sharman | H04L 12/1822 |
| | | | | 704/235 |
| 6,122,614 | A * | 9/2000 | Kahn | G10L 15/063 |
| | | | | 704/235 |
| 6,173,259 | B1 * | 1/2001 | Bijl | G06F 3/16 |
| | | | | 704/235 |
| 6,175,820 | B1 * | 1/2001 | Dietz | G10L 15/1807 |
| | | | | 704/235 |
| 8,286,071 | B1 * | 10/2012 | Zimmerman | G16H 10/60 |
| | | | | 715/205 |
| 2005/0114122 | A1 | 5/2005 | Uhrbach et al. | |
| 2005/0240404 | A1 * | 10/2005 | Gurram | G10L 15/32 |
| | | | | 704/231 |
| 2012/0301057 | A1 * | 11/2012 | Conant | B65D 31/04 |
| | | | | 383/64 |
| 2012/0304057 | A1 * | 11/2012 | Labsky | G10L 13/08 |
| | | | | 715/256 |
| 2012/0310644 | A1 * | 12/2012 | Zimmerman | G06F 40/274 |
| | | | | 704/235 |
| 2018/0060282 | A1 * | 3/2018 | Kaljurand | G06F 40/284 |

OTHER PUBLICATIONS

PCT/US2017/049117, Dec. 1, 2017, International Search Report and Written Opinion.

* cited by examiner

| DICTATED | WRITTEN |
|---|---|
| the cervical spine was tender high at C two | the cervical spine was tender high at C2 |
| fixation at L two comma L three comma and L four with significant improvement | fixation at L2, L3, and L4 with significant improvement |
| a posterior T two to L two fusion | a posterior T2-L2 fusion |
| decompression from approximately T two to six | decompression from approximately T2-6 |
| there is no palpable gap at L three through S one | there is no palpable gap at L3 through S1 |
| degenerative changes about the L three four comma L four five comma and L five S one disk region | degenerative changes about the L3-4, L4-5, and L5-S1 disk region |
| there is no subluxation at C one C two and C two C three | there is no subluxation at C1-C2 and C2-C3 |

500

How to dictate? — 510

VERTEBRAE PARAMETERS

Write vertebra symbol with
[ Arabic numeral ▶ ]

Write second part of vertebrae expression
[ as spoken ▶ ]

Connect parts of vertebrae range
[ with hyphen, unless 'through' ▶ ]

Connect adjacent vertebrae with
[ - ▶ ]

FIG. 5

USER INTERFACE FOR DICTATION APPLICATION EMPLOYING AUTOMATIC SPEECH RECOGNITION

BACKGROUND

Automatic speech recognition (ASR), as discussed herein, is the transcription, by machine, of audio speech into text. Among the various approaches to automatic speech recognition are statistically-based speech recognition techniques, often including acoustic modeling and language modeling. An acoustic model generally is trained to analyze acoustic features of an input speech signal and generate one or more hypotheses as to the sequence of sound units that the signal contains. Popular types of acoustic models today include hidden Markov models (HMMs) and neural networks. A language model generally is trained to work with an acoustic model to determine which candidate word sequences that could match the acoustics of the speech signal are most likely to be what the speaker actually said. Statistical language models (SLMs) are generally trained by being exposed to large corpora of text and observing the occurrence frequencies of various possible sequences of words (and/or other suitably defined tokens) in those training corpora. The probabilities of different word sequences learned from the training data are then applied to score the likelihood of different candidate word sequences hypothesized for an input speech signal. A popular form of SLM today is the N-gram language model, which approximates the probability of a longer word sequence as a combination of the probabilities of each word in the sequence in the context of the preceding N−1 words.

ASR is useful in a variety of applications, including in dictation software which recognizes user speech and outputs the corresponding automatically transcribed text. A typical dictation application may output the transcribed text of the dictated speech to a visual display for the user's review, often in near real-time while the user is in the process of dictating a passage or document. For example, a user may dictate a portion of a passage, the dictation application may process the dictated speech by ASR and output the corresponding transcribed text, and the user may continue to dictate the next portion of the same passage, which may subsequently be processed, transcribed, and output. Alternatively or additionally, some dictation applications may output text transcriptions via one or more other media, such as printing on a physical substrate such as paper, transmitting the text transcription to a remote destination, non-visual text output such as Braille output, etc.

SUMMARY

One type of embodiment is directed to a system comprising at least one display, at least one audio input device, at least one processor, and at least one storage medium storing processor-executable instructions that, when executed by the at least one processor, cause the system to: provide a user interface, in an automatic speech recognition (ASR) dictation application, for informing a user how to dictate desired text; receive, from the user of the dictation application, input specifying a desired text sequence; and automatically provide to the user via the user interface, in response to the received input, output indicating one or more speech sequences that, when spoken by a user, received via the at least one audio input device, and recognized by the dictation application using ASR, would cause the dictation application to output the desired text sequence as a recognition result via the at least one display.

Another type of embodiment is directed to a method in an automatic speech recognition (ASR) dictation application, the method comprising: providing a user interface for informing a user how to dictate desired text; receiving, from the user of the dictation application, input specifying a desired text sequence; and automatically providing to the user via the user interface, in response to the received input, output indicating one or more speech sequences that, when spoken by a user and recognized by the dictation application using ASR, would cause the dictation application to output the desired text sequence as a recognition result.

Another type of embodiment is directed to at least one non-transitory computer-readable storage medium storing computer-executable instructions that, when executed, perform a method in an automatic speech recognition (ASR) dictation application, the method comprising: providing a user interface for informing a user how to dictate desired text; receiving, from the user of the dictation application, input specifying a desired text sequence; and automatically providing to the user via the user interface, in response to the received input, output indicating one or more speech sequences that, when spoken by a user and recognized by the dictation application using ASR, would cause the dictation application to output the desired text sequence as a recognition result.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 5 illustrates another exemplary GUI for an HTD tool, in accordance with some embodiments;

DETAILED DESCRIPTION

Figure 1:
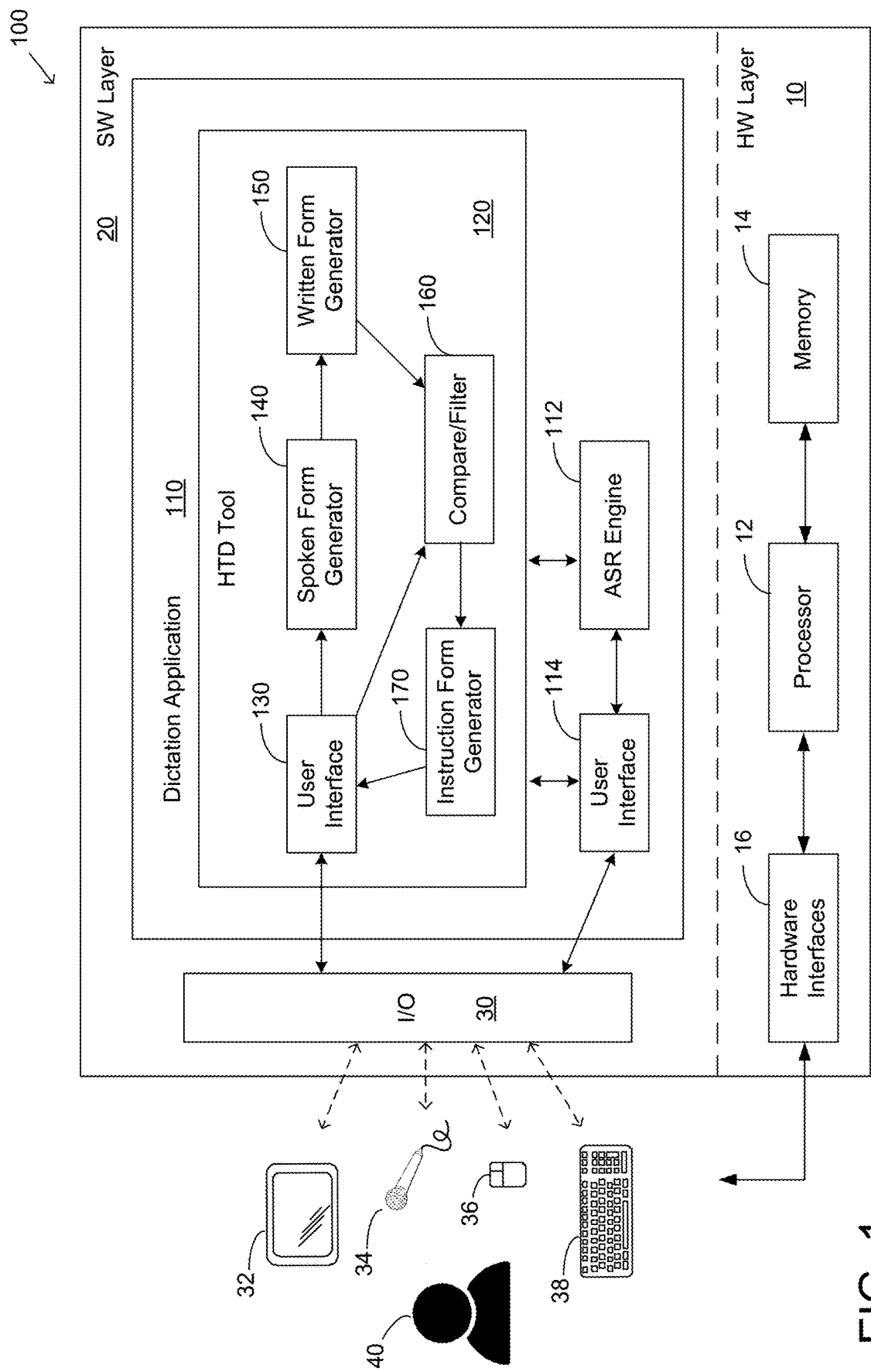
FIG. 1 is a block diagram of an exemplary operating environment in which some embodiments may be implemented.

Some dictation applications may apply formatting rules to determine how certain spoken items, once recognized by ASR, will be formatted in their textual form in the output transcription. For example, when the user dictates the spoken form "twelve o'clock," a formatting rule may specify whether the output textual form should be the text "twelve o'clock" or the text "12:00" (or the text "12 o'clock," or any other suitable corresponding written form supported by the dictation application). Some applications may provide a set of parameters, each of which a user may specify a setting for or leave in a default configuration to determine how a particular type of item will be formatted. For example, a dictation application may provide one or more parameters for the formatting of time-of-day items, with one possible setting of the parameter(s) indicating that a spoken form "_o'clock" will be transcribed as the text "_o'clock," another possible setting of the parameter(s) indicating that the spoken form "_o'clock" will be transcribed as the text "_:00," etc.

The inventor has appreciated that there are many potential instances in which a particular spoken sequence can have multiple valid corresponding textual forms; and vice versa, instances in which a particular text sequence can have multiple possible ways in which it could be dictated as speech (possibly depending on formatting parameter settings). For example, if the applicable formatting parameters are set appropriately, a dictation application might produce the text sequence "⅔" in response to a user's dictation of any of multiple possible corresponding spoken forms, such as "two thirds," "two over three," "two slash three," etc. However, the inventor has appreciated that there are also many potential instances in which some possible spoken forms will not produce the desired text sequence when dictated—for example, if the dictation application does not include a formatting parameter to allow those particular spoken forms to be transcribed into the desired text sequence, or if the applicable formatting parameter has not been set as required to produce that transcription. For example, in some regional dialects, the text sequence "⅔" may commonly be spoken in other ways, such as "two on three," "two by three," etc. Some dictation applications, for example, may require a particular formatting parameter setting to be applied in order for spoken sequences of "[number] on [number]" to be transcribed as text sequences of "[numeral]/[numeral]." Otherwise, if the required formatting parameter setting is not applied (or if the particular dictation application does not support that parameter setting), then the spoken sequence "two on three" will not be transcribed as "⅔," but rather as a direct transcription "two on three" (or possibly "2 on 3," etc.).

The inventor has further recognized that it may be difficult for a typical user to anticipate or remember which spoken sequences can be used in a particular dictation application to produce a particular desired text output. It may be even more difficult, the inventor has appreciated, for a user to determine which formatting parameters need to be set in which configurations within the dictation application to allow the user to dictate a particular desired text in a particular way. The inventor has recognized that these challenges may be particularly cumbersome in use cases in which dictated texts typically include a significant number of expressions with special symbols, abbreviations, digits, etc. A relevant use case, for example, is the dictation of medical reports in the healthcare industry, which often contain expressions that don't have an apparent standard form, such as "C1/C2," "2 cc/2-4 h," "3×5 cm," "500 mg p.o. q.d.×14 days," etc. When intending the vertebrae range "C1/C2" in a dictation, for example, some doctors may be inclined to say "C one C two;" some may be inclined to say "C one slash two;" some may say only "C one two;" some may think they have to speak the entire "C one slash C two" because they are unaware that the dictation application is capable of correctly interpreting any other spoken form; etc.

The inventor has appreciated that conventional dictation applications can be frustrating and cumbersome for users, since it is often not straightforward to understand how desired text expressions can be effectively dictated. For example, the user who always dictates long forms such as "C one slash C two," not realizing that shorter spoken forms may be available to produce the same desired text output "C1/C2" within the dictation application, may find the entire dictation process long and cumbersome. In another example, a user who tries to dictate "C one C two," without realizing that a particular formatting parameter setting is required for the dictation application to insert the "/" in the output textual form, may not implement the correct parameter setting, and may therefore end up with an incorrect output such as "C1C2" instead of the desired "C1/C2." If the user reviews the output and notices the error, the user may then have to spend time correcting the text, which the user may find frustrating and inefficient, especially when the same type of error continues to recur repeatedly in the user's use of the dictation application. On the other hand, if the user does not notice the error, then the resulting document or other form of dictation output may contain an inaccuracy that may have further detrimental consequences. For example, in the medical field, errors in dictated reports could lead to inaccurate patient records, problems with billing and reimbursement, and worse—incorrect treatment of patients. At the very least, manual correction of dictation errors takes busy clinicians' valuable time away from treating patients, and/or adds to the workload of other documentation review personnel. The inventor has appreciated that such difficulties giving rise to inefficiencies and/or inaccuracies in dictation have been a pervasive setback to the widespread adoption of dictation software in many industries including healthcare, even though the use of ASR for document generation theoretically should produce attractive efficiency and productivity gains.

The inventor has recognized, however, that efficiency, accuracy, and/or user satisfaction with dictation software may be improved by providing a how-to-dictate (HTD) tool that instructs a user how to dictate the user's desired text within a dictation application. The inventor has developed techniques, as described herein, for providing this information interactively via a user interface, in response to input from the user specifying the text that the user desires to dictate. The inventor has further developed techniques for integrating instruction as to parameter settings required in order to dictate a desired text in a particular way, as well as techniques for efficiently integrating the HTD user interface into the user's workflow in using the dictation application.

Accordingly, some embodiments described herein relate to techniques for providing an HTD user interface for an ASR dictation application, which techniques may address one or more of the above-discussed shortcomings of traditional applications, and/or that may provide one or more of the foregoing benefits. Some embodiments may thus provide improvements to conventional ASR dictation technologies, e.g., in the form of increased efficiency and/or accuracy of automated transcriptions, and/or enhanced user-accessibility and/or ease-of-use of dictation applications. However, some embodiments are not limited to any of these benefits, and it should be appreciated that some embodiments may not provide any of the above-discussed benefits and/or may not address any of the above-discussed deficiencies that the inventor has recognized in conventional applications.

In some embodiments, a user interface may be provided in an ASR dictation application, for informing a user how to dictate desired text. Input may be received from the user of the dictation application, specifying a desired text sequence. In response to the received input, output may automatically be provided via the user interface, indicating one or more speech sequences that would produce the desired text sequence when dictated. (I.e., the output may indicate one or more speech sequences that, when spoken by a user and recognized by the dictation application using ASR, would cause the dictation application to output the desired text sequence as a recognition result.)

For example, in some embodiments, the user may enter the desired text sequence in a text input field of the user interface, to retrieve a list of speech sequences that would produce the desired text sequence when dictated. In another example, in some embodiments the user may select the desired text sequence from within a passage of text containing the desired text sequence, and the selection may be input to the HTD tool to produce information on the spoken form(s) for the selected text. In another example, in some embodiments the HTD tool may be applied to correction text, that the user specified to replace another text sequence previously output by the dictation application. For example, in some embodiments, when a user has repeatedly made similar corrections replacing previously dictated text with the same corrected text sequence, the HTD tool may provide instruction via its user interface on how to dictate the corrected text sequence such that fewer corrections may be required in future dictations and the user's dictation efficiency/satisfaction may be increased.

In some embodiments, the HTD user interface may instruct the user how to dictate a desired text by providing text representations of the speech sequence(s) for dictating the desired text. Alternatively or additionally, in some embodiments the speech sequence(s) may be output in audio form as synthesized speech. In some instances, there may be multiple possible speech sequences that would produce the same desired text when dictated, and the HTD user interface may list all or some of these multiple possible speech sequences for the user. In some embodiments, the HTD tool may further provide via the user interface an indication of one or more parameter settings that would be required for one or more of the listed speech sequences to cause the dictation application to output the desired text sequence as a recognition result. This feature may conveniently and efficiently instruct the user how to arrange for a particular desired text sequence to be dictated in a particular desired way, by instructing the user which parameter settings need to be applied, in some embodiments. Alternatively or additionally, in some embodiments the HTD user interface may provide a selectable option, in association with a possible speech sequence for dictating the desired text, that the user may select within the HTD user interface to cause an update to the appropriate parameter setting for that speech sequence to cause the desired text to be output by the dictation application going forward. As such, in some embodiments, the user may conveniently and efficiently obtain instruction from the HTD tool as to how to dictate a desired text, select a desired speech sequence for dictating the desired text from among multiple possibilities presented by the HTD tool, and immediately update the appropriate formatting parameters to be able to use the desired speech sequence going forward, all within a compact HTD user interface in the dictation application.

It should be appreciated that the foregoing description is by way of example only, and some embodiments are not limited to providing any or all of the above-described functionality, although some embodiments may provide some or all of the functionality described herein.

The inventive concepts described herein can be implemented in any of numerous ways, and are not limited to any particular implementation techniques. Thus, while examples of specific implementation techniques are described below, it should be appreciated that the examples are provided merely for purposes of illustration, and that other implementations are possible.

FIG. 1 illustrates an exemplary operating environment for a system 100 for use in ASR dictation. System 100 may be implemented in any of various suitable forms. For example, system 100 may be implemented as a single stand-alone machine, or may be implemented by multiple distributed machines that share processing tasks in any suitable manner. System 100 may be implemented as one or more computers; an example of a suitable computer is described below. In some embodiments, system 100 may include one or more tangible, non-transitory processor-readable storage devices (e.g., memory 14) storing processor-executable instructions, and one or more processors (e.g., processor 12) that execute the processor-executable instructions to perform the functions described herein. The storage devices may be implemented as computer-readable storage media (i.e., tangible, non-transitory computer-readable media) encoded with the processor-executable instructions; examples of suitable computer-readable storage media are discussed below.

Exemplary system 100 is illustrated in FIG. 1 as having a hardware layer 10 including computer hardware components such as processor(s) 12 and memory 14, as well as a software layer 20. It is to be understood that the components of software layer 20 may be instantiated by the operation of processor(s) 12 executing processor-executable instructions stored in and retrieved from memory 14. Memory 14 may include any suitable form(s) of volatile and/or non-volatile storage media, examples of which are discussed below.

Hardware layer 10 of exemplary system 100 further includes one or more hardware interfaces 16 for connecting with and allowing processor 12 to communicate with one or more peripheral devices, examples of which are illustrated as 32-38. (As used herein, the term "peripheral device" encompasses any user input devices and/or output devices, whether or not the device shares the same physical housing as the processor 12, as in the display, keyboard, mouse, etc. of a laptop or tablet computer.) Hardware interfaces 16 may be any suitable form of hardware interfaces, examples of which are known. It should be understood that hardware layer 10 may further include any other hardware components in addition to those illustrated in FIG. 10, as embodiments are not limited in this respect.

Software layer 20 of exemplary system 100 includes a dictation application 110, which may be a software application run via execution by processor 12 of a set of program code stored in memory 14. Exemplary dictation application 110 includes, among other possible components not illustrated in FIG. 1, an ASR engine 112 and a user interface component 114. ASR engine 112 performs automatic speech recognition (ASR) on audio speech input by a user, and thus automatically transcribes the input speech into output text. ASR engine 112 may utilize any suitable ASR technology and techniques, examples of which are known. ASR engine 112 receives data representations of input audio speech from, and outputs data representations of output recognized text to, user interface component 114. Although user interface component 114 and ASR engine 112 are each depicted in FIG. 1 as a single component for ease of illustration, it should be appreciated that they may be implemented in any suitable architecture, including alternatively as sets of separate components for performing separate sub-functions, as embodiments are not limited in this respect.

User interface component 114 of dictation application 110 utilizes input/output (I/O) functions 30 of computer system 100 to communicate with peripheral devices as part of presenting a user interface to the user 40. User 40 may input audio speech as well as other user input to dictation application 110 through interaction with the user interface (i.e., through using the peripheral devices to provide user input which may be communicated to user interface component 114 via I/O functions 30). For example, user 40 may input audio speech to dictation application 110 using any suitable audio input device(s), such as microphone 34 in the example of FIG. 1. User 40 may also manually input text and/or other input such as commands using any suitable manual input device(s), such as keyboard 38 and mouse 36 in the example of FIG. 1. User 40 may utilize these input devices in conjunction with viewing visual components of the user interface on any suitable form of visual output device, such as display 32 in the example of FIG. 1. In some embodiments, user 40 may utilize any of various suitable forms of peripheral devices with combined functionality, such as a touchscreen device that includes both display functionality and manual input functionality via the same screen, and thereby embodies both an output device (e.g., display) and an input device.

User interface component 114 may pass at least some of the user's input to dictation application 110 (including received speech) to ASR engine 112, which may process the speech through ASR and output the recognition result(s) to user interface component 114. User interface component 114 may then present the recognition result(s) as transcribed text to the user on one or more suitable peripheral devices using I/O functions 30. It should be understood that I/O functions 30 include software functions executed by processor 12 that communicate with the peripheral devices by causing signals to be sent to the peripheral devices and received from the peripheral devices by processor 12 through hardware interfaces 16. I/O functions 30 may be implemented in any suitable form, examples of which are known, and may typically be provided by an operating system component of software layer 20. It should further be appreciated that software layer 20 may include any other components in addition to those illustrated in FIG. 1 (e.g., other operating system components, other applications, etc.), as embodiments are not limited in this respect.

In some embodiments, dictation application 110 may further include a how-to-dictate (HTD) tool 120, which may be a software component within dictation application 110 that may be run via execution of one or more program code modules by processor(s) 12. Alternatively, in some embodiments, HTD tool 120 may be a software component separate from dictation application 110, and may be run in conjunction with and interact with dictation application 110, e.g., via any suitable API(s) or other software communications. In either type of implementation, in some embodiments the HTD tool 120 may present one or more HTD user interfaces in the dictation application, with which user 40 may interact within the context of using the dictation application 110. These HTD user interfaces may be presented to user 40 in the same graphical window(s) as other components of dictation application 110, and/or in separate (e.g., pop-up, pop-out, etc.) windows and/or panels from components of dictation application 110. Examples of suitable graphical user interfaces for an HTD tool are discussed further below.

In some embodiments, HTD tool 120 may include a user interface component 130 that may utilize I/O functions 30 of system 100 to provide the HTD user interface(s) to user 40 via any suitable available peripheral devices of system 100. For example, in some embodiments, user interface component 130 may receive user input specifying a desired text sequence (e.g., that the user would like to know how to dictate). A data representation of this desired text sequence may be passed, in some embodiments, from user interface component 130 to a spoken form generator 140 within HTD tool 120. In some embodiments, spoken form generator 140 may process the desired text sequence (e.g., via execution of program instructions by processor(s) 12) to generate a set of one or more possible spoken forms for the desired text sequence, e.g., utilizing techniques discussed further below. It should be appreciated that the "spoken forms" generated by spoken form generator 140 internal to HTD tool 120 in system 100 are not actually spoken at this time, but rather are data representations of speech sequences that could potentially be recognized as corresponding to the desired text sequence. In some embodiments, spoken form generator 140 may utilize data and/or functionality of one or more other components of dictation application 110, such as ASR engine 112, in processing the desired text sequence. For example, in some embodiments, spoken form generator 140 may refer to and/or otherwise utilize formatting rules, tokenization components, concept sets, and/or other data and/or components of ASR engine 112 in generating the list of possible spoken forms for the desired text sequence. However, this is not required, and spoken form generator 140 may be self-contained in that it may not utilize other resources of dictation application 110 in processing the desired text sequence in some embodiments.

In some embodiments, the possible spoken forms generated by spoken form generator 140 may then be passed to written form generator 150. Written form generator 150 may process each of the generated spoken forms, in some embodiments, to generate a list of possible written forms that could be output if the spoken form were recognized by ASR engine 112 of dictation application 110. Written form generator 150 may process the spoken forms, e.g., utilizing techniques discussed further below. It should be appreciated that the "written forms" generated by written form generator 150 internal to HTD tool 120 in system 100 may not actually be "written" at this point, in the sense of being inscribed in a human-readable medium; but rather are data representations of text sequences that could potentially result if the spoken form were recognized via ASR. In some embodiments, written form generator 150 may utilize data and/or functionality of one or more other components of dictation application 110, such as ASR engine 112, in processing the spoken forms. For example, in some embodiments, written form generator 150 may refer to and/or otherwise utilize formatting rules of ASR engine 112 in generating the list of possible written forms for each spoken form received from spoken form generator 140. However, this is not required; for example, in some embodiments, written form generator 150 may have access to an appropriate set of formatting rules consistent with those used by ASR engine 112, but may not access them directly from ASR engine 112. Also, in some embodiments and for some inputs, formatting rules may not be needed.

In some embodiments, the possible written forms generated by written form generator 150 may then be passed to compare/filter component 160, which may also receive the user input desired text sequence from user interface 130. (Alternatively, the desired text sequence may be passed through spoken form generator 140 and written form generator 150 along with the generated spoken and written forms, and received by compare/filter component 160 along that path. Embodiments are not limited to any particular data path for the desired text sequence, written forms, spoken forms, and/or formatting configurations to reach compare/filter component 160.) In some embodiments, compare/filter component 160 may compare each written form generated by written form generator 150 to the input desired text sequence, and may discard any combination of a [spoken form, formatting parameter setting configuration] pair that generates a written form that does not match the desired text sequence. If any of the generated spoken forms have no corresponding written forms that match the desired text sequence, those spoken forms may be discarded entirely, in some embodiments.

Those spoken forms that are not discarded by compare/filter component 160 may be processed, in some embodiments, by instruction form generator 170, which may convert each acceptable spoken form into a form that is suitable for instructing the user how to speak that spoken form. In some embodiments, the instruction form may be a textual representation of the string of speech tokens in the spoken form, which may be presented visually to the user 40 by user interface component 130 via display 32. Alternatively or additionally, in some embodiments, instruction form generator 170 may convert a spoken form to audio synthesized speech, which may be presented aurally to the user 40 by user interface component 130 via one or more audio output devices (not shown in FIG. 1), such as one or more speakers. Other examples of instruction forms are possible, and some embodiments are not limited to any particular form of presentation of a possible spoken form of a desired text sequence to the user.

In some embodiments, HTD tool 120 may additionally or alternatively interact with any of various components of dictation application 110 in other ways than described above. For example, in some embodiments, user input to HTD tool 120 may be received via native user interface component 114 of dictation application 110, alternatively or in addition to via HTD user interface component 130. In some embodiments, alternatively or additionally, output from HTD tool 120 may be presented to user 40 via user interface component 114, alternatively or in addition to via user interface component 130. While a particular architecture of HTD tool 120 and dictation application 110 and their subcomponents is depicted in FIG. 1 for illustrative purposes, it should be appreciated that many other suitable architectures are possible, and embodiments are not limited to any particular software architecture. For example, in some embodiments, dictation application 110 and HTD tool 120 and/or any of their subcomponents may not be architecturally separated as the illustrative boxes in FIG. 1 may potentially imply, but rather may be implemented as functionality of more integrated software code.

In addition, while hardware layer 10 and software layer 20 of system 100 may be illustrated in FIG. 1 as potentially implemented on a single physical device, not all embodiments are so limited. In other examples, any or all of the components illustrated in FIG. 1 may be implemented on one or more separate machines, or parts of any or all of the components may be implemented across multiple machines in a distributed fashion and/or in various combinations, including network-distributed (e.g., client-server) implementations.

Although FIG. 1 illustrates an embodiment in which certain components are illustrated in software executed by one or more processors, not all embodiments are so limited. Each of the components of system 100 that processes data may be implemented in software, hardware, or a combination of software and hardware. Components implemented in software may comprise sets of processor-executable instructions that may be executed by the one or more processors of system 100 to perform the functionality described herein.

Each of the components may be implemented as a separate component of system 100 (e.g., implemented by hardware and/or software code that is independent and performs dedicated functions of the component), or any combination of these components may be integrated into a single component or a set of distributed components (e.g., hardware and/or software code that performs two or more of the functions described herein may be integrated, the performance of shared code may be distributed among two or more hardware modules, etc.). In addition, any one of the functional components may be implemented as a set of multiple software and/or hardware components.

Figure 2:
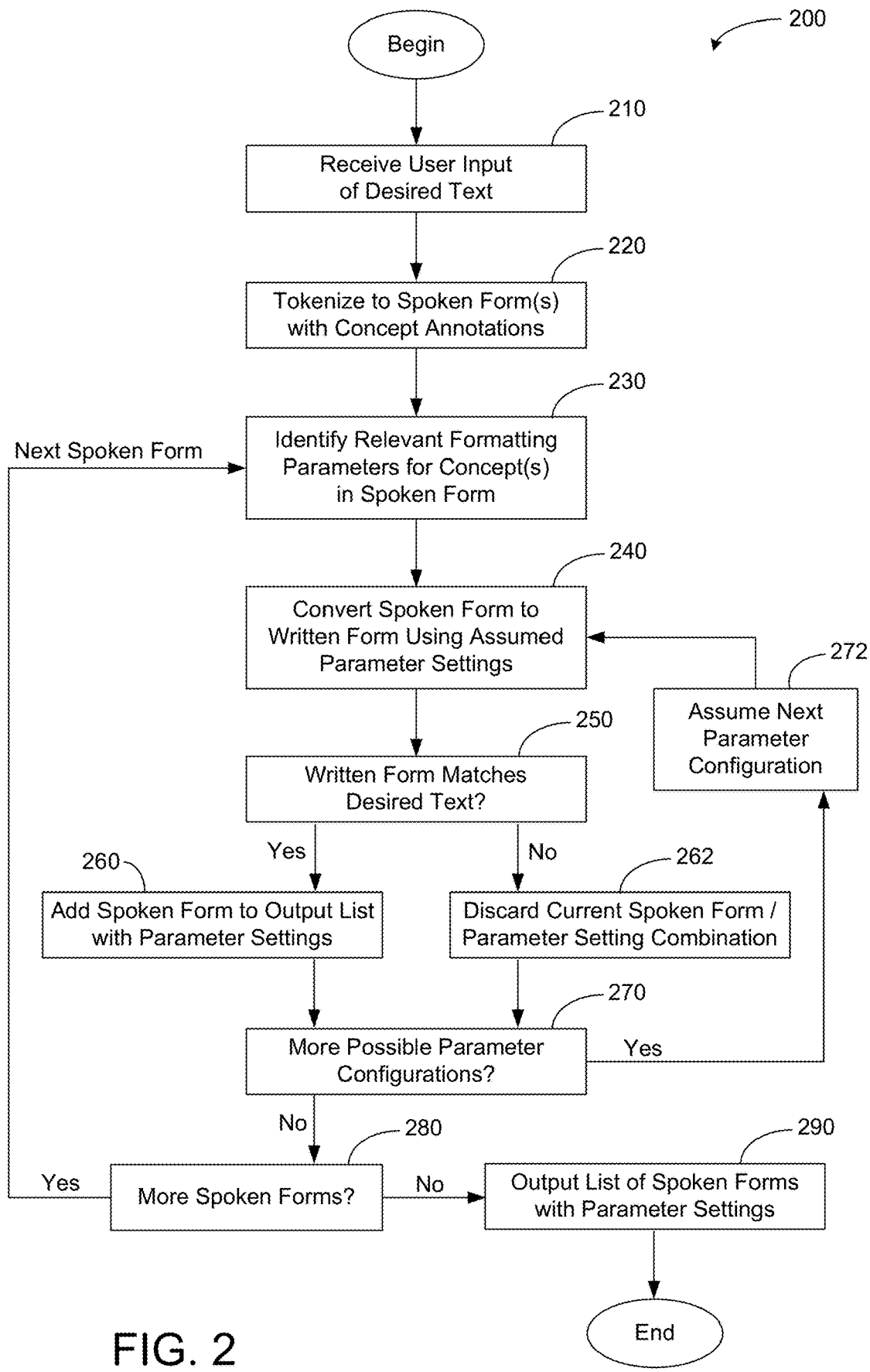
FIG. 2 is a flowchart of an exemplary process for use with a dictation application, in accordance with some embodiments.

FIG. 2 illustrates an exemplary process 200 that may be performed, for example, by an HTD tool in connection with a dictation application, such as the exemplary HTD tool 120 illustrated in FIG. 1, for informing a user how to dictate a desired text. At act 210 of exemplary process 200, the HTD tool may receive user input specifying a desired text sequence. This user input may be in any suitable form that specifies the user's desired text. A number of examples of possible input forms are discussed further below in connection with examples of various user interface configurations.

At act 220 of exemplary process 200, the input desired text sequence may be tokenized to produce a set of one or more possible spoken forms for the desired text sequence. Act 220 may be performed, for example, by spoken form generator 140 of exemplary HTD tool 120 in some embodiments, or by any other suitable component. In some embodiments, this component may include a rule-based or statistical (or hybrid) tokenizer that converts the input desired text sequence into a sequence of tokens representing a speech sequence, in which each token is a unit that could be considered a spoken "word" in the speech sequence, regardless of whether it would be considered an individual word in the text sequence. For example, given the input desired text sequence "C1/C2," in some embodiments the tokenizer may convert this to the spoken form "C one slash C two," in which each of "C," "one," "slash," "C," "two" is a token in this context. In some embodiments, the tokenizer may generate a list of possible spoken forms for the desired text sequence. In this example, the list may include, e.g., "C one slash C two," "C one C two," "C one slash two," and "C one two."

In some embodiments, tokenizing the desired text sequence may further include annotating tokens and/or token sequences in the spoken form(s) with labels of known concepts detected in the desired text sequence. For example, in some embodiments, the tokenizer may have access to any suitable list of known concepts to be detected in text sequences, as well as rules and/or models for how they are detected. For example, the desired text sequence "lateral C1/C2 puncture" may be tokenized and concept-annotated as "lateral <VertebraeRange> C one slash C two </VertebraeRange> puncture." This may equivalently be represented as data including the sequence of tokens "lateral C one slash C two puncture" accompanied by annotations of the form <start index, end index, concept tag>, such as <2, 6, VertebraeRange>, where the seven tokens in the token sequence are indexed 1 through 7 from left to right (and tokens 2-6 are annotated with the VertebraeRange concept tag). In another example representation, the annotated token sequence may be represented as a tree, such as a tree in which the tokens are leaf nodes and the concept tags are non-leaf nodes, such as the following:

```
[root node]
  - lateral
  - <VertebraeRange>
    -- C
    -- one
    -- slash
    -- C
    -- two
  - puncture
```

It should be appreciated that tokenizer output representing spoken forms of a desired text sequence may be in any suitable data representation form, as embodiments are not limited in this respect. Also, any suitable set of defined concepts may be used by the HTD tool. In some embodiments, the set of defined concepts may be at least partially shared with formatting components of the dictation application. For purposes of illustration, some non-limiting examples of suitable concept tags are provided below. These examples may be suitable, for instance, for a dictation application in a medical use case; however, this is merely for purposes of example, and it should be appreciated that embodiments are not limited to this particular use case or to use of any of the following examples of concepts.

Example List of Tokenizer Concepts
(with text examples in parentheses following the concept names)

| | |
|---|---|
| Date | (05/26/2016, May 26, 2016) |
| Time | (11:27 PM) |
| PhoneNumber | (+1 23 456 789) |
| Address | (123 Park St., New York, NY1234, USA) |
| VertebraeRange | (C1-C3) |
| Number | (10, 10.5, 1/3) |
| LargeNumber | (5 million vs 5,000,000) |
| Fraction | (⅓, 1½) |
| Decimal | (10.5) |
| Measurement | (100 mph, 100 km/h) |
| Dosage | (10 ml q.o.d. p.o.) |
| DailyDosage | (1-0-1, 50 g-10 g-50 g) |
| By | (2 cm x 3 cm) |
| BloodPressure | (BP 100/80) |
| PersonName | (John Smith) |
| DepartmentName | (Radiology) |
| DrugName | (Advil) |
| Title | (Prof., Dr.) |
| NumberedList | (1. item one) |
| SectionHeading | (IMPRESSION) |
| RomanNumeralExpressions | (type II, stage IIIA) |
| TNM codes | (ypT0N0M0) |
| email address | (john@domain.com) |
| web address | (www.domain.com) |

Any suitable tokenizer technology and/or technique(s) may be used for converting the desired text sequence to one or more spoken forms including a sequence of speech tokens with or without concept annotations. Examples of tokenizers are known and may use any suitable technique(s) such as regular expressions, named entity recognition, context-free grammars, etc. In some embodiments, the tokenizer may output a likelihood score in association with a generated spoken form. The likelihood may be calculated based on any suitable factor(s). In some embodiments, for example, one or more language model scores and/or acoustic model scores (and/or a combined score with these as components) may be utilized, e.g., representing the likelihood that a particular spoken form would be correctly recognized via ASR when spoken. In some embodiments, the set of spoken forms generated by the tokenizer may be pruned based on such scores, to retain only the N-best top ranking spoken forms for subsequent processing.

At act 230 of exemplary process 200, for a first one of the spoken forms generated in the tokenization act, one or more sets of relevant formatting parameters for concepts annotated in the spoken form may be identified. In some embodiments, these may be formatting parameters that are available in the dictation application for the annotated concepts. For instance, for the example spoken form "<VertebraeRange> C one C two </VertebraeRange>," in one example implementation the dictation application may support four formatting parameters for the <VertebraeRange> concept: {VertebraeSymbol}, {VertebraeLetter}, {VertebraeRangeBinder}, and {VertebraeNeighborBinder}. The {VertebraeSymbol} formatting parameter may control whether a number spoken in a speech sequence tagged as a vertebrae range will be output in the text as an Arabic numeral or a Roman numeral (e.g., "C1/C2" vs. "CI/CII"). The {VertebraeLetter} formatting parameter may control whether a second letter "C" (or "T" or "L" for other types of vertebrae) will be inserted in the output text if the spoken form of the VertebraeRange concept includes only one "C" (as in the speech sequence "C one slash two"). For example, if the parameter setting is {VertebraeLetter=Expand}, then the dictated speech sequence "C one slash two" may produce the text output "C1/C2;" while if the parameter setting is {VertebraeLetter=AsSpoken}, then the dictated speech sequence "C one slash two" may only produce "C1/2," and the user may have to explicitly speak the second "C" to make it appear in the output text. The {VertebraeRangeBinder} formatting parameter may control whether a symbol such as a hyphen will be used in the output text for a range spanning three or more vertebrae, such as outputting the text "C1-C3" for the dictated speech sequence "C one to C three." The {VertebraeNeighborBinder} formatting parameter may control what symbol (e.g., slash, hyphen, etc.) will be inserted in the output text between two neighboring vertebrae. For example, if the parameter setting is {VertebraeNeighborBinder=Slash}, then the dictated speech sequence "C one C two" may produce the text output "C1/C2;" while if the parameter setting is {VertebraeNeighborBinder=Hyphen}, then the same dictated speech sequence may produce the different text output "C1-C2;" and if the parameter setting is {VertebraeNeighborBinder=Off}, then the same dictated speech sequence may produce the text "C1C2."

Any suitable set of formatting parameters may be used by the HTD tool, and in some embodiments these may at least partially match the formatting parameters supported by the dictation application. For purposes of illustration, some non-limiting examples of suitable formatting parameters in association with non-limiting examples of concept tags to which they may be relevant are provided below. These examples may be suitable, for instance, for a dictation application in a medical use case; however, this is merely for purposes of example, and it should be appreciated that embodiments are not limited to this particular use case or to use of any of the following examples of concepts or formatting parameters.

Example List of Formatting Parameters

Concept: VertebraeRange
  - Write vertebra number as
    - Arabic numeral
    - Roman numeral
  - Write second part of vertebrae range
    - as spoken
    - expanded

- Connect parts of vertebrae range
  - as spoken
  - with hyphen, unless 'through'
  - with hyphen
- Connect adjacent vertebrae with
  - -
  - /

Concept: Date
- Date formatting
  - disabled
  - as spoken
  - as half-numeric (month always by name)
  - as fully numeric
  - as ISO-formatted
- Write month
  - as spoken
  - abbreviated
  - as a Roman numeral
- Day-Month order
  - as spoken
  - converted to day-month order
  - converted to month-day order
- Write single-digit day and month numbers
  - as spoken
  - with a leading zero
- Assume
  - day-month order
  - month-day order
- Long date separator
  - -
  - /
  - ". " (period space)
- Write years
  - as spoken
  - always with four digits Concept: Number
- Write number as numeral, if greater than or equal to
  - 0
  - 2
  - 10
  - 100
  - (infinity)
- Write ordinal number as numeral, if greater than or equal to
  - 0
  - 1
  - 2
  - 3
  - 10
  - 13
  - (infinity)
- Write "-illion-ended" numbers
  - 5 million
  - 5,000,000
- Write "less than" and "greater than"
  - as spoken
  - with symbols < and >
- Write fractions
  - a half
  - 1/2
  - ½
- Write improper fractions
  - five fourths
  - 5/4
- Write mixed numbers
  - three and a half
  - 3 1/2
  - 3-1/2
  - 3½
- Write "over"
  - as spoken
  - with symbol /
- Write "out of"
  - as spoken
  - with symbol /
- Bind numbers to units with
  - " " (space)
  - non-breaking space Concept: MeasurementUnit
- Write prefix "micro-"
  - as spoken
  - as "μ"
  - as "u"
  - as "mc"
- Write "microgram(s)"
  - as spoken
  - as "μg"
  - as "ug"
  - as "mcg"
- Write metric square and cube units with
  - superscript number ($m^2$)
  - baseline number (m2)
  - sq/cu
- Write "cubic centimeter"
  - as in "Write metric square and cube units with"
  - as "cc"
  - as "ml"
  - as "mL"
- Write "liter"
  - as "l"
  - as "L"
- Write non-metric units
  - as spoken
  - abbreviated without period
  - abbreviated with period
- Write non-metric square and cubed units (area and volume)
  - as spoken
  - abbreviated no period superscript
  - abbreviated period superscript
  - abbreviated no period baseline number
  - abbreviated period baseline number
- Write "unit"
  - as spoken
  - as "U"
- Write "degrees"
  - as spoken
  - as "°"
- Write "degrees Fahrenheit" and "degrees Celsius"
  - as spoken
  - as "° F., ° C."
- Write "percent"
  - as spoken
  - as "%" (without space)
  - as " %" (with space)
- Write "parts per million"
  - as spoken
  - as "ppm"
  - as "PPM"
- Write "beats per minute"
  - as spoken
  - as "bpm"
  - as "BPM"

Concept: Dosage
- Write dosage frequency abbreviation (e.g. "t.i.d.")
  - as spoken
  - as spoken, no spaces
  - as spoken, no periods
  - as spoken, no spaces, no periods
  - expanded
- Write dosage route abbreviation (e.g. "p.o.")
  - as spoken
  - as spoken, capitalized
  - as spoken, capitalized, no periods
  - expanded as adverb
  - expanded as adjective
- Write dosage location abbreviation (e.g. "o.s.")
  - as spoken
  - as spoken, capitalized
  - as spoken, capitalized, no periods
  - expanded Concept: NumberedList
- Numbered list item prefix
  - no indentation, number preceded by #
  - indentation, no #
  - indentation, number preceded by #
  - no indentation, no #

```
    - Numbered list item separator
       - new paragraph
       - new line
       - nothing
Concept: TNMCode
    - TNM code
       - T3N2M0
       - T3 N2 M0
       - T3, N2, M0
Concept: ProperName
    - Person name capitalization
       - John Smith
       - JOHN SMITH
    - Write titles (Mister, General, Sister)
       - Mister
       - Mr.
    - Department name capitalization
       - Orthopedics
       - ORTHOPEDICS
    - Drug name capitalization
       - aspirin, BuSpar
       - Aspirin, BuSpar
       - ASPIRIN, BUSPAR
Concept: SectionHeading
    - Section heading capitalization
       - first word, proper nouns and some specific words
         capitalized
       - first word and all other words capitalized except for
         articles, prepositions of less than 5 letters and
         conjunctions
       - all letters uppercase
    - Subsection heading capitalization
       - first word, proper nouns and some specific words
         capitalized
       - first word and all other words capitalized except for
         articles, prepositions of less than 5 letters and
         conjunctions
       - all letters uppercase
```

Thus, for example, in some embodiments the relevant formatting parameters for the <VertebraeRange> concept in the spoken form "<VertebraeRange> C one C two </VertebraeRange>" may be identified as: {VertebraeSymbol} (a.k.a. "Write vertebra number as"), {VertebraeLetter} (a.k.a. "Write second part of vertebrae range"), {VertebraeRangeBinder} (a.k.a. "Connect parts of vertebrae range"), and {VertebraeNeighborBinder} (a.k.a. "Connect adjacent vertebrae with").

At act 240 of exemplary process 200, a first possible configuration of the relevant formatting parameters identified for the current spoken form being processed may be assumed, and the spoken form may be converted to a written form using the assumed parameter settings. For example, given the spoken form "<VertebraeRange> C one C two </VertebraeRange>" being processed, a first possible configuration for the formatting parameters identified as being relevant to the <VertebraeRange> concept may be assumed as follows: {VertebraeSymbol=Arabic, VertebraeLetter=AsSpoken, VertebraeRangeBinder=AsSpoken, VertebraeNeighborBinder=Hyphen}. When this assumed formatting parameter configuration is applied to the spoken form "<VertebraeRange> C one C two </VertebraeRange>," the resulting written form may be "C1-C2." Act 240 may be performed, for example, by written form generator 150 of exemplary HTD tool 120 in some embodiments, or by any other suitable component.

At act 250 of exemplary process 200, a comparison may be performed to determine whether the written form generated at act 240 matches the input desired text sequence. At act 260, if it is determined that the written form matches the desired text, then the spoken form and its parameter settings from which that written form was generated may be added to the list of acceptable spoken forms for output. On the other hand, if it is determined that the written form generated at act 240 does not match the desired text, then at act 262 the current combination of spoken form and particular parameter setting configuration being processed may be discarded. For example, when the written form "C1-C2" generated in the example above is compared with the input desired text sequence "C1/C2," it may be determined that the two do not match. As a result of this determination, the pairing of [spoken form "<VertebraeRange> C one C two </VertebraeRange>" and parameter setting configuration {VertebraeSymbol=Arabic, VertebraeLetter=AsSpoken, VertebraeRangeBinder=AsSpoken, VertebraeNeighborBinder=Hyphen}] may be discarded from further consideration, since it does not produce the desired text sequence. Act 260 may be performed, for example, by compare/filter component 160 of exemplary HTD tool 120 in some embodiments, or by any other suitable component.

At act 270 of exemplary process 200, a determination may be made as to whether there are further possible parameter setting configurations that have not yet been processed for the current spoken form under consideration. If there are, a next possible parameter setting configuration may be assumed at act 272, and process 200 may return to act 240. At this next iteration of act 240, the newly assumed parameter setting configuration may be used in converting the spoken form to a written form, to determine whether the written form under that parameter setting configuration will match the desired text sequence. In some embodiments, process 200 may iterate through all possible combinations of the formatting parameter settings identified in act 230 as being relevant to the concept(s) in the current spoken form. For example, for the <VertebraeRange> concept in the spoken form "<VertebraeRange> C one C two </VertebraeRange>", process 200 may generate the corresponding written form under each of the following 24 possible parameter setting configurations and compare the resulting written form to the desired text output:

| Config. | Vertebrae Symbol | Vertebrae Letter | Vertebrae Range Binder | Vertebrae Neighbor Binder | Written Form | Match? |
|---|---|---|---|---|---|---|
| 1 | Arabic | AsSpoken | AsSpoken | Hyphen | C1-C2 | No |
| 2 | Arabic | AsSpoken | AsSpoken | Slash | C1/C2 | Yes |
| 3 | Arabic | AsSpoken | Hyphen Unless Through | Hyphen | C1-C2 | No |
| 4 | Arabic | AsSpoken | Hyphen Unless Through | Slash | C1/C2 | Yes |
| 5 | Arabic | AsSpoken | Hyphen | Hyphen | C1-C2 | No |
| 6 | Arabic | AsSpoken | Hyphen | Slash | C1/C2 | Yes |
| 7 | Arabic | Expand | AsSpoken | Hyphen | C1-C2 | No |
| 8 | Arabic | Expand | AsSpoken | Slash | C1/C2 | Yes |
| 9 | Arabic | Expand | Hyphen Unless Through | Hyphen | C1-C2 | No |
| 10 | Arabic | Expand | Hyphen Unless Through | Slash | C1/C2 | Yes |
| 11 | Arabic | Expand | Hyphen | Hyphen | C1-C2 | No |
| 12 | Arabic | Expand | Hyphen | Slash | C1/C2 | Yes |
| 13 | Roman | AsSpoken | AsSpoken | Hyphen | CI-CII | No |
| 14 | Roman | AsSpoken | AsSpoken | Slash | CI/CII | No |
| 15 | Roman | AsSpoken | Hyphen Unless Through | Hyphen | CI-CII | No |

-continued

| Config. | Vertebrae Symbol | Vertebrae Letter | Vertebrae Range Binder | Vertebrae Neighbor Binder | Written Form | Match? |
|---|---|---|---|---|---|---|
| 16 | Roman | AsSpoken | Hyphen Unless Through | Slash | CI/CII | No |
| 17 | Roman | AsSpoken | Hyphen | Hyphen | CI-CII | No |
| 18 | Roman | AsSpoken | Hyphen | Slash | CI/CII | No |
| 19 | Roman | Expand | AsSpoken | Hyphen | CI-CII | No |
| 20 | Roman | Expand | AsSpoken | Slash | CI-CII | No |
| 21 | Roman | Expand | Hyphen Unless Through | Hyphen | CI-CII | No |
| 22 | Roman | Expand | Hyphen Unless Through | Slash | CI/CII | No |
| 23 | Roman | Expand | Hyphen | Hyphen | CI-CII | No |
| 24 | Roman | Expand | Hyphen | Slash | CI/CII | No |

In some embodiments, each formatting parameter setting configuration that produces a written form that matches the desired text sequence may be added to the output list in association with the current spoken form being processed, and any formatting parameter setting configurations that produce written forms that do not match the desired text sequence may be discarded for the current spoken form. After the final iteration, when all of the possible parameter configurations have been processed, if no configuration has resulted in a written form that matches the desired text sequence, then the spoken form may be discarded entirely as being unsuitable to produce the desired text sequence under any formatting parameter configuration.

For example, for the "<VertebraeRange> C one C two </VertebraeRange>" spoken form example above, the parameter setting configurations that may be retained after discarding those that produce written forms that do not match the desired text sequence may be the following:

| Config. | Vertebrae Symbol | Vertebrae Letter | Vertebrae Range Binder | Vertebrae Neighbor Binder | Written Form | Match? |
|---|---|---|---|---|---|---|
| 2 | Arabic | AsSpoken | AsSpoken | Slash | C1/C2 | Yes |
| 4 | Arabic | AsSpoken | Hyphen Unless Through | Slash | C1/C2 | Yes |
| 6 | Arabic | AsSpoken | Hyphen | Slash | C1/C2 | Yes |
| 8 | Arabic | Expand | AsSpoken | Slash | C1/C2 | Yes |
| 10 | Arabic | Expand | Hyphen Unless Through | Slash | C1/C2 | Yes |
| 12 | Arabic | Expand | Hyphen | Slash | C1/C2 | Yes |

When it is determined at act 270 that there are no more formatting parameter setting configurations remaining to be considered, exemplary process 200 may proceed to act 280, where a determination may be made as to whether there are further spoken forms remaining to be processed from the list generated at act 220. If there are, then process 200 may loop back to act 230, at which the relevant formatting parameters for the next spoken form in the list may be determined. Written forms may then be generated for that spoken form under all possible relevant formatting parameter setting configurations and compared to the desired text sequence, and so on.

It should be appreciated, however, that process 200 illustrated in FIG. 2 is merely one example, and other variations are possible. For example, in some alternative embodiments, a process to determine an output list of acceptable spoken forms to produce a desired text sequence may not iterate through all possible formatting parameter setting configurations, but instead may only consider a subset of possible formatting parameter setting configurations. In some embodiments, for instance, only the dictation application's current parameter settings may be considered. For example, if the dictation application's <VertebraeRange> parameters are currently set to {VertebraeSymbol=Arabic, VertebraeLetter=AsSpoken, VertebraeRangeBinder=AsSpoken, VertebraeNeighborBinder=Hyphen}, then only that parameter setting configuration may be considered in determining the spoken form(s) that will produce the desired text output, and the spoken form(s) that might be acceptable under other possible parameter configurations may not be considered or output, in some embodiments.

In another possible variation, in some embodiments, act 230 of exemplary process 200 may not be carried out. For example, in some embodiments, instead of identifying which formatting parameters are relevant for a given spoken form, the process may simply iterate through all available formatting parameter configurations and determine which ones generate written forms that match the desired text sequence. In some embodiments, when the setting of a particular formatting parameter does not affect whether the resulting written form matches the desired text sequence, this may provide the indication that this parameter is not relevant for the current spoken form, and that parameter may not be explicitly represented in the output.

For further illustration, the following is exemplary pseudocode suitable for an exemplary generator function How_To_Dictate_1 that takes as input the desired text sequence wf, tokenizer, formatter, and set of all possible configurations Set<Configuration>, and generates pairs of <spoken form token sequence ts, formatting parameter setting configuration fc>:

```
function Get_Token_Sequence(t):
    return sequence of tokens in t (e.g., leaf-nodes in tree in left-to-right order)
function How_To_Dictate_1(wf, Tokenizer, Formatter, Set<Configuration>):
    foreach t in Tokenizer(wf):
        ts = Get_Token_Sequence(t)
        foreach formatter configuration fc in Set<Configuration>:
            if wf == Formatter(ts, fc) then yield <ts,fc>
```

The following is exemplary pseudocode suitable for restricting the formatter input only to formatting parameters relevant to the spoken form under consideration, which utilizes an additional function Get_Concept_Tag that returns the concept tag(s) in the spoken form:

```
function How_To_Dictate_2(wf, Tokenizer, Formatter,
    Map<ConceptTag, Set<Configuration>> map):
    foreach t in Tokenizer(wf):
        ts = Get_Token_Sequence(t)
        ct = Get_Concept_Tag(t)
        for each formatter configuration fc in map(ct):
            if wf == Formatter(ts, fc) then yield <ts,fc>
```

When it is determined at act 280 that all of the possible spoken forms for the desired text sequence have been processed, exemplary process 200 may proceed to act 290, at which the list of acceptable <spoken form, parameter setting configuration> pairs generated through all iterations of act 260 (i.e., those that produced written forms matching the desired text sequence) may be output. In some embodiments, if no spoken forms have resulted in any written forms that match the desired text sequence, then a message or other suitable output may be presented to the user to indicate that no recommended way of dictating the desired text sequence was found. If acceptable speech sequences to produce the desired text sequence have been found, the list may be output in any suitable form that facilitates informing the user how to dictate the desired text sequence. For example, in some embodiments, the list may be output directly to the user via a user interface such as one generated by user interface component 130 of HTD tool 120. In some other embodiments, the list may be further processed before any output is presented to the user, such as by instruction form generator 170.

In some embodiments, the instruction form output may present the list of acceptable spoken forms (with or without accompanying formatting parameter setting configurations) in a manner understandable to the typical user. For example, in some embodiments, concept tags may be hidden from generated spoken forms before the spoken forms are presented to the user. In some embodiments, tokens in the spoken forms may be converted to a representation that is understandable to the user. For example, in some embodiments, spoken form tokens may be represented internally to the system as data associating, e.g., internal IDs with particular tokens. In some such embodiments, the token IDs may be converted to textual spellings before presenting the spoken form as a text sequence that indicates to the user how to pronounce the speech sequence represented by the spoken form. In some embodiments, text representations of spoken form tokens may be presented to the user in phonetic spellings, or otherwise in ways that facilitate the user's understanding of how the tokens should be pronounced. In some embodiments, speech sequences represented by spoken forms may be presented to the user in audio form as synthesized speech, using any suitable speech synthesis technique(s).

For example, the following table illustrates possible instruction forms and their corresponding parameter configurations for producing the desired text "C1/C2" from the example above:

| Instruction Form | Vertebrae Symbol | Vertebrae Letter | Vertebrae RangeBinder | Vertebrae Neighbor Binder |
| --- | --- | --- | --- | --- |
| C one slash C two | Arabic | AsSpoken | AsSpoken | Hyphen |
| C one slash C two | Arabic | AsSpoken | AsSpoken | Slash |
| C one slash C two | Arabic | AsSpoken | Hyphen UnlessThrough | Hyphen |
| C one slash C two | Arabic | AsSpoken | Hyphen UnlessThrough | Slash |
| C one slash C two | Arabic | AsSpoken | Hyphen | Hyphen |
| C one slash C two | Arabic | AsSpoken | Hyphen | Slash |
| C one slash C two | Arabic | Expand | AsSpoken | Hyphen |
| C one slash C two | Arabic | Expand | AsSpoken | Slash |
| C one slash C two | Arabic | Expand | Hyphen | Hyphen |
| C one slash C two | Arabic | Expand | Hyphen UnlessThrough | Slash |
| C one slash C two | Arabic | Expand | Hyphen | Hyphen |
| C one slash C two | Arabic | Expand | Hyphen | Slash |
| C one slash two | Arabic | Expand | AsSpoken | Hyphen |
| C one slash Iwo | Arabic | Expand | AsSpoken | Slash |
| C one slash two | Arabic | Expand | Hyphen UnlessThrough | Hyphen |
| C one slash two | Arabic | Expand | Hyphen UnlessThrough | Slash |
| C one slash two | Arabic | Expand | Hyphen | Hyphen |
| C one slash two | Arabic | Expand | Hyphen | Slash |
| C one C Iwo | Arabic | AsSpoken | AsSpoken | Slash |
| C one C two | Arabic | AsSpoken | Hyphen UnlessThrough | Slash |
| C one C two | Arabic | AsSpoken | Hyphen | Slash |
| C one C two | Arabic | Expand | AsSpoken | Slash |
| C one C two | Arabic | Expand | Hyphen UnlessThrough | Slash |
| C one C two | Arabic | Expand | Hyphen | Slash |
| C one two | Arabic | Expand | AsSpoken | Slash |
| C one two | Arabic | Expand | Hyphen UnlessThrough | Slash |
| C one two | Arabic | Expand | Hyphen | Slash |

Figure 3:
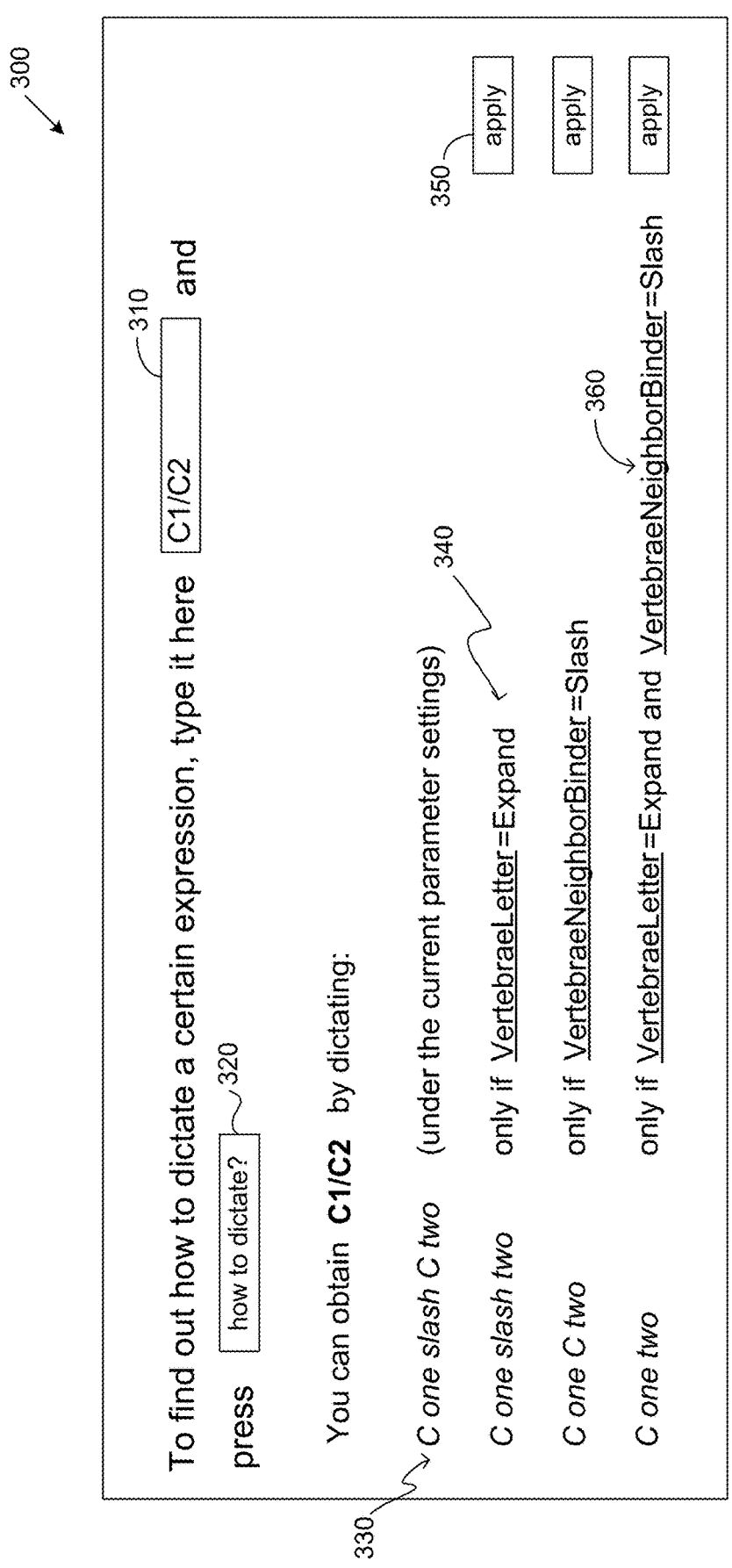
FIG. 3 illustrates an exemplary graphical user interface (GUI) for a how-to-dictate (HTD) tool, in accordance with some embodiments.

User interface component 130 may present output informing a user how to dictate a desired text sequence in any suitable form. By way of example and not limitation, FIGS. 3-5 provide various different examples of possible user interfaces for informing a user how to dictate desired text in an ASR dictation application. It should be appreciated that these are merely exemplary, and other forms and designs of user interfaces are also possible.

FIG. 3 illustrates an exemplary graphical user interface (GUI) 300 that may be presented in some embodiments by an HTD tool in connection with an ASR dictation application to inform a user how to dictate desired text. In the exemplary GUI 300, a text input field 310 is provided into which the user may enter the desired text sequence that the user would like to find out how to dictate. Thus, in some embodiments, the HTD tool may receive the user's input specifying the desired text sequence by receiving the desired text sequence entered by the user in the text input field 310 of the user interface 300. Exemplary GUI 300 further provides a button 320 which the user may activate to cause the desired text sequence entered in the text input field 310 to be submitted to the HTD tool and processed to determine one or more speech sequences that, if spoken by the user and recognized by the dictation application using ASR, would cause the dictation application to output the submitted desired text sequence as a recognition result.

In some embodiments, providing output indicating the one or more identified speech sequences may include outputting text representations of the speech sequence(s) via a display. In exemplary GUI 300, for example, in response to the user's submission of the desired text sequence "C1/C2" via the text input field 310 and the submission button 320, a list 330 may be provided including output textual representations of the speech sequences "C one slash C two," "C one slash two," "C one C two," and "C one two." In this example, the instruction forms indicating the speech sequences have removed the concept tags from the corresponding internal data representations of the spoken forms, and have spelled out the speech tokens in a manner readable, understandable and pronounceable by the user. As illustrated in this example, some embodiments may list a plurality of speech sequences, different from each other, each of which could cause the dictation application to output the desired text sequence as a recognition result when recognized using ASR.

In some embodiments, in addition to indicating to the user a speech sequence that could be dictated to produce the desired text sequence, an HTD tool may also provide to the user, via the user interface, an indication of one or more parameter settings (e.g., formatting parameter settings, and/or any other type(s) of parameter settings that may impact how spoken forms are transcribed by the dictation application) that would be required to cause the dictation application to output the desired text sequence as a recognition result when that speech sequence is recognized using ASR.

For example, in GUI 300, each listed speech sequence 330 is provided along with an indication 340 of what changes (if any) would need to be made to the current formatting parameter settings to allow that speech sequence to produce the desired text sequence "C1/C2" when dictated. In this example, GUI 300 indicates that the current parameter settings (which in this case may be {VertebraeSymbol=Arabic, VertebraeLetter=AsSpoken, VertebraeNeighborBinder=Hyphen}) are sufficient to allow the speech sequence "C one slash C two" to produce the desired text sequence "C1/C2." However, to allow the second speech sequence "C one slash two" to produce the desired text sequence "C1/C2," the setting of the parameter {VertebraeLetter} would have to be changed to {VertebraeLetter=Expand}. GUI 300 further indicates, in this example, that to allow the third speech sequence "C one C two" to produce the desired text sequence "C1/C2," the setting of the parameter {VertebraeNeighborBinder} would have to be changed to {VertebraeNeighborBinder=Slash}; and to allow the fourth speech sequence "C one two" to produce the desired text sequence "C1/C2," both parameters {VertebraeLetter} and {VertebraeNeighborBinder} would need their settings changed to {VertebraeLetter=Expand, VertebraeNeighborBinder=Slash}.

As can be appreciated from this example, in some embodiments one or more parameters that do not affect whether the presented speech sequences will produce the desired text sequence may not be presented in the output via the user interface. For example, from the table of acceptable pairings of speech sequences and parameter configurations above for the example desired text sequence "C1/C2," it can be determined that the setting of the {VertebraeRangeBinder} parameter has no effect on how to dictate "C1/C2," and therefore this parameter may not be mentioned in the output via GUI 300. As can also be appreciated from this example, in some embodiments one or more parameters that do not need to be changed from their current settings to cause the presented speech sequences to produce the desired text sequence may not be presented in the output via the user interface. For instance, in this example, the current setting of {VertebraeSymbol=Arabic} does not need to be changed to cause any of the speech sequences 330 to produce the desired text sequence "C1/C2," and therefore the {VertebraeSymbol} parameter is not mentioned in the parameter indications 340. As can further be appreciated from this example, in some embodiments some parameters may be mentioned for some listed speech sequences and not for others. For example, in some embodiments, a parameter may only be mentioned in connection with speech sequences that would require a change in that parameter in order to produce the desired text output. For instance, in the example of FIG. 3, the {VertebraeNeighborBinder} parameter is mentioned in connection with speech sequences C one C two and C one two because they each require changing to the {VertebraeNeighborBinder=Slash} parameter setting; but the same parameter is not mentioned in connection with speech sequences C one slash C two and C one slash two, since no change is required to that parameter to allow those speech sequences to produce the desired text sequence.

In some embodiments, the HTD user interface may further provide a selectable option to update to the parameter setting(s) required to cause the dictation application to output the desired text sequence as a recognition result when a listed speech sequence is recognized using ASR. Exemplary GUI 300 provides this option in the form of "apply" button 350, which appears next to each indication 340 of one or more parameter setting changes required to allow a listed speech sequence to produce the desired text output when dictated. In some embodiments, as in exemplary GUI 300, user selection of the selectable option in the HTD user interface may cause the corresponding formatting parameter settings in the dictation application to be updated to the settings in connection with which the selectable option is provided. For example, in GUI 300, selecting the first "apply" button 350 may cause the dictation application's formatting parameter settings to be updated to {VertebraeLetter=Expand}, such that the dictated speech sequence "C one slash two" will produce the text sequence "C1/C2" going forward. In some embodiments, after the formatting parameter settings are updated, the output list in the HTD user interface may also be updated, for example to update which speech sequences will produce the desired text output under the updated "current parameter settings," and to remove the "apply" option and explicit listing of settings that are now part of the current configuration. As another example, some embodiments may bring the user to the dictation application's native parameter configuration panel open to the corresponding formatting parameter in response to the user's selection of the "apply" option. An example of such a configuration panel native to a dictation application is illustrated in FIG. 5.

Figure 4A:
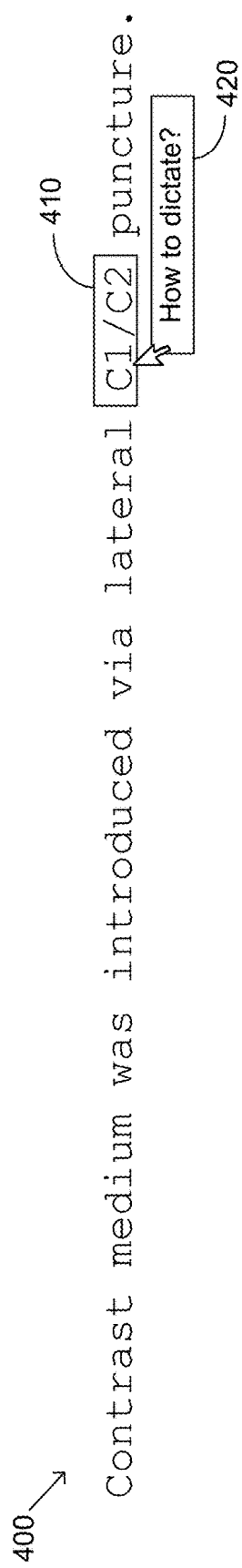
FIGS. 4A and 4B illustrate other exemplary GUIs for an HTD tool, in accordance with some embodiments.

In some embodiments, the HTD tool may alternatively or additionally receive the user's input specifying the desired text sequence by receiving a selection by the user of the desired text sequence from within a passage of text containing the desired text sequence. FIG. 4A illustrates an example of an HTD GUI 400 in which the user may indicate the desired text sequence in this way. In the example of FIG. 4A, the user is interacting with a passage of text within the dictation application, and the passage includes the sentence, "Contrast medium was introduced via lateral C1/C2 puncture." This passage may have been entered into the document with which the user is currently working in any suitable way. For example, the user may have dictated the sentence using the dictation application, or may have entered all or part of the sentence manually by typing. The user may also have dictated all or part of the sentence, and then corrected or otherwise edited all or part of the dictated sentence by manual correction and/or by utilizing speech commands provided by the dictation application for editing existing text. Regardless of how the passage is entered, the user may select the desired text sequence (in this case, "C1/C2") from within the passage, as input to the HTD tool. In the exemplary GUI 400, the user selects the desired text sequence by highlighting 410, and then right-clicks on (or otherwise operates on) the selected text to expose a context option 420 selectable to input the selected text as the desired text sequence to the HTD tool. In response to selecting option 420, the HTD tool may then process the desired text sequence and output the determined acceptable speech sequences in any suitable way—for example, by calling up GUI 300 with the selected text pre-populated as input.

Figure 4B:
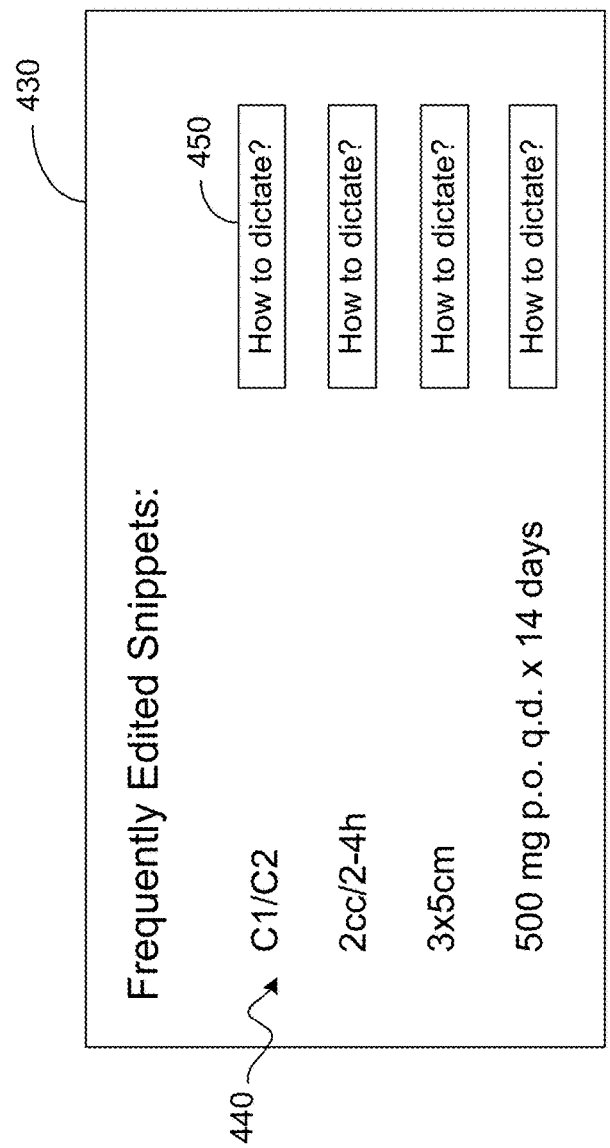

In some embodiments, the HTD tool may alternatively or additionally receive the user's input specifying the desired text sequence by receiving a correction by the user that replaces another text sequence previously output by the dictation application with the desired text sequence. For example, in some embodiments, when the user corrects a previously output text sequence by replacing it with a different text sequence, an assumption may be made that the replacement text sequence may be a desired text sequence that the user may desire to learn how to dictate correctly in the future. In some embodiments, an option may be provided right away for the user to call up the HTD tool in response to a correction of dictated text. In other embodiments, corrections may be aggregated over a period of time and filtered and/or ranked such that text sequences that are frequently used as correction replacements may be used as input to the HTD tool to instruct the user how to dictate them more efficiently. FIG. 4B illustrates an example GUI 430 that may be provided to present the user with a list of frequently used replacement text sequences 440, along with corresponding selectable options 450 to submit each text sequence 440 as a desired text sequence for processing by the HTD tool. In response to selection of any of the buttons 450, the HTD tool may then process the corresponding text sequence and output the speech sequences determined to be acceptable for dictating that desired text sequence in any suitable way—for example, in some embodiments, user selection of a button 450 corresponding to a frequently used replacement text sequence 440 may call up GUI 300 with the text sequence 440 pre-populated as input. Such a GUI 430, as illustrated by example in FIG. 4B, may be presented at any suitable frequency, such as once per week or any other suitable time interval, upon each start-up of the dictation application, upon explicit request by the user, and/or based on any other suitable timing and/or trigger.

In another example, in some embodiments an HTD user interface may be provided and/or linked within the context of the dictation application's native configuration menu, panel, or other interface. FIG. 5 illustrates an example of such an integrated user interface 500, in which a selectable option (e.g., button) 510 is provided within the dictation application's native configuration panel for <VertebraeRange> formatting parameters. In this example, user selection of button 510 may activate the HTD user interface (e.g., GUI 300, or another suitable HTD user interface) from the context of the configuration panel in which the user can see all of the relevant formatting parameters.

As yet another example, in some embodiments an HTD user interface may present its output as a table in which each row lists an acceptable speech sequence for the desired text sequence, together with a possible formatting parameter setting configuration that would allow that speech sequence to produce the desired text sequence when dictated. Such a tabular or list output may be provided in response to a user inputting a desired text sequence in any suitable way, including but not limited to any of the embodiments of input and UIs described above. In some embodiments, the user may be provided with the ability to sort the table either by speech sequence or by parameter configuration, in the former case allowing the user to appreciate multiple possible parameter configurations that may support the same speech sequence, and in the latter case allowing the user to appreciate multiple possible speech sequences that may be supported by the same parameter configuration. In some embodiments, the rows of the table may alternatively or additionally be sortable by any suitable other criteria, such as the number of tokens in each speech sequence, the number of parameters whose settings would need to be changed to arrive at each configuration, one or more language model and/or acoustic model scores assigned to speech sequences (e.g., by the tokenizer), and/or any other suitable criteria. In some embodiments, regardless of the format of the HTD user interface, the pairs of speech sequences and required parameter configurations may be ranked and/or limited to a predetermined number of best recommendations for output. The ranking and/or pruning may be performed using any suitable criteria, such as those mentioned above (e.g., number of tokens, number of parameter settings to change, tokenizer scores, etc.).

Figure 6:
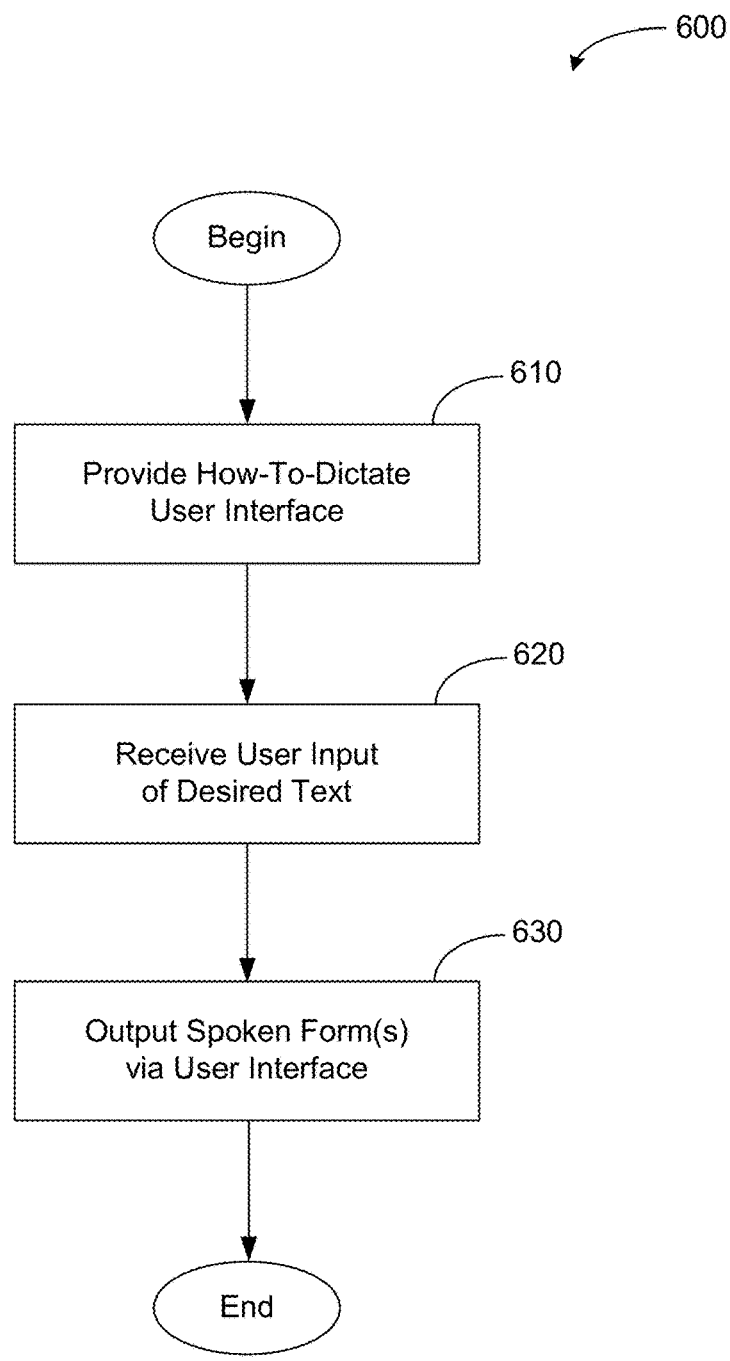
FIG. 6 is a flowchart of an exemplary method in accordance with some embodiments.

It should be appreciated from the foregoing that one embodiment is directed to a method 600 for use with an ASR dictation application, as illustrated in FIG. 6. Method 600 may be performed, for example, by one or more components of an HTD tool such as HTD tool 120, although other implementations are possible, as method 600 is not limited in this respect. Method 600 begins at act 610, at which a user interface may be provided for informing a user how to dictate desired text. At act 620, input specifying a desired text sequence may be received from the user of the dictation application. At act 630, in response to the received input, output may automatically be provided to the user via the user interface, indicating one or more speech sequences that, when spoken by a user and recognized by the dictation application using ASR, would cause the dictation application to output the desired text sequence as a recognition result. Exemplary algorithms for each of these acts of exemplary method 600 are provided in the discussion of previous Figures above.

It should be appreciated that the various concepts disclosed above may be implemented in any of numerous ways, as the concepts are not limited to any particular manner of implementation. For instance, the present disclosure is not limited to the particular arrangements of components shown in the various figures, as other arrangements may also be suitable. Such examples of specific implementations and applications are provided solely for illustrative purposes.

Figure 7:
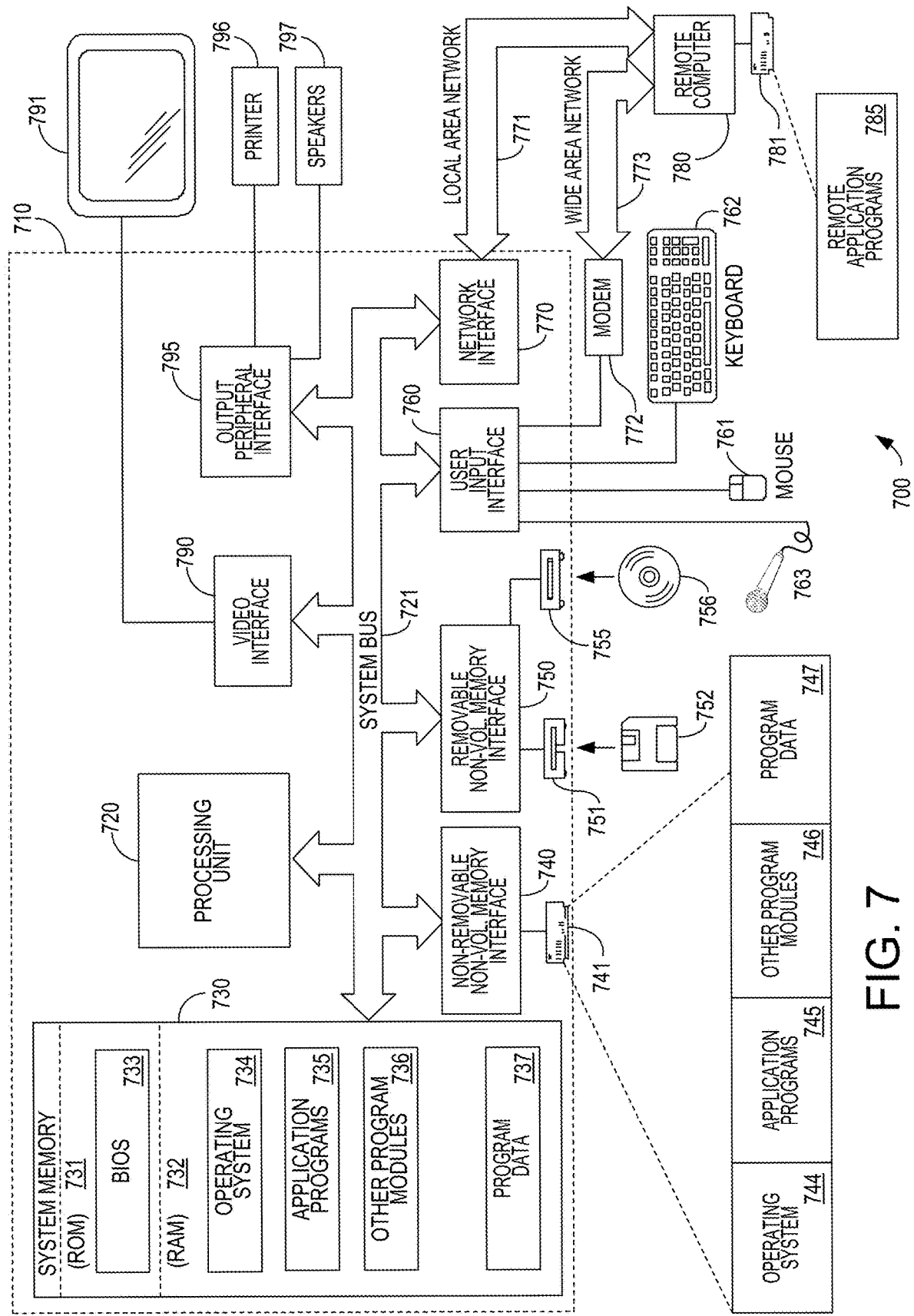
FIG. 7 is a block diagram illustrating exemplary computing system components with which some embodiments may be implemented.

FIG. 7 shows an illustrative example of a computing system environment 700 in which various inventive aspects of the present disclosure may be implemented. This computing system may be representative of a computing system that allows a suitable control system to implement the described techniques. However, it should be appreciated that the computing system environment 700 is only one example of a suitable computing environment and is not intended to suggest any limitation as to the scope of use or functionality of the described embodiments. Neither should the computing environment 700 be interpreted as having any dependency or requirement relating to any one or combination of components illustrated in the illustrative operating environment 700.

The embodiments are operational with numerous other computing system environments or configurations. Examples of computing systems, environments, and/or configurations that may be suitable for use with the described techniques include, but are not limited to, personal computers, server computers, hand-held or laptop devices, multi-processor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc., that perform particular tasks or implement particular abstract data types. The embodiments may also be practiced in distributed computing environments where tasks are performed by remote processing devices that are linked through a communications network. In a distributed computing environment, program modules may be located in both local and remote computer storage media including memory storage devices.

With reference to FIG. 7, an illustrative system for implementing the described techniques includes a computer 710. Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Computer 710 typically includes a variety of computer readable media.

Computer readable media can be any available media that can be accessed by computer 710 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the illustrative operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7 provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information into the computer 710 through input devices such as a microphone 763, keyboard 762, and pointing device 761, commonly referred to as a mouse, trackball or touch pad. Other input devices (not shown) may include a joystick, game pad, satellite dish, scanner, touchscreen, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 795.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on memory device 781. It will be appreciated that the network connections shown are illustrative and other means of establishing a communications link between the computers may be used.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with non-dedicated hardware (e.g., one or more processors) that is programmed using microcode or software to perform the functions recited above.

In this respect, it should be appreciated that one implementation comprises at least one computer-readable storage medium (i.e., at least one tangible, non-transitory computer-readable medium, e.g., a computer memory (e.g., hard drive, flash memory, processor working memory, etc.), a floppy disk, an optical disc, a magnetic tape, or other tangible, non-transitory computer-readable medium) encoded with a computer program (i.e., a plurality of instructions), which, when executed on one or more processors, performs above-discussed functions. The computer-readable storage medium can be transportable such that the program stored thereon can be loaded onto any computer resource to implement functionality discussed herein. In addition, it should be appreciated that the reference to a computer program which, when executed, performs above-discussed functions, is not limited to an application program running on a host computer. Rather, the term "computer program" is used herein in a generic sense to reference any type of computer code (e.g., software or microcode) that can be employed to program one or more processors to implement above-discussed techniques.

The phraseology and terminology used herein is for the purpose of description and should not be regarded as limiting. The use of "including," "comprising," "having," "containing," "involving," and variations thereof, is meant to encompass the items listed thereafter and additional items. Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Several embodiments having been described in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A system to instruct a user how to dictate to an automatic speech recognition (ASR) dictation application, comprising:
   at least one processor; and
   at least one storage medium storing processor-executable instructions that, when executed by the at least one processor, cause the system to:
      receive a textual user input indicating a desired textual expression to be generated as an ASR result, the textual user input having been provided via a user interface useable for instructing a user how to dictate desired text, and
      in response to receipt of the textual user input indicating the desired textual expression:
         determine a speech sequence that, when provided as a speech input to the ASR dictation application, would be recognized using ASR such that the desired textual expression is output as an ASR transcription of the speech sequence, and
         output, via the user interface, an instruction to the user of speech to input to the ASR dictation application to result in the desired textual expression being generated as an ASR recognition result, wherein outputting of the instruction comprises outputting the speech sequence in a textual format for presentation in the user interface together with the desired textual expression received as the textual user input.

2. The system of claim 1, wherein the desired textual expression is inputted by the user via the user interface as a selection from within a passage of text containing the desired textual expression.

3. The system of claim 1, wherein the desired textual expression is a correction by the user that replaces another textual expression previously output by the ASR dictation application.

4. The system of claim 1, wherein the user interface comprises at least one display.

5. The system of claim 1, further comprising at least one audio output device, wherein the speech sequence is output in an audio format as synthesized speech via the at least one audio output device.

6. The system of claim 1, wherein the speech sequence is output via the user interface as part of a listing of a plurality of speech sequences, different from each other, each of which could cause the ASR dictation application to output the desired textual expression as an ASR recognition result when recognized using ASR.

7. The system of claim 6, wherein the processor-executable instructions, when executed by the at least one processor, cause the system to provide to the user via the user interface, for a first speech sequence of the plurality of output speech sequences, an indication of at least one parameter setting required to cause the ASR dictation application to output the desired textual expression as an ASR recognition result when the first speech sequence is recognized using ASR.

8. The system of claim 6, wherein the processor-executable instructions, when executed by the at least one processor, cause the system to provide to the user via the user interface, for a first speech sequence of the plurality of output speech sequences, a selectable option to update at least one parameter setting required to cause the ASR dictation application to output the desired textual expression as an ASR recognition result when the first speech sequence is recognized using ASR.

9. A method for instructing a user how to dictate to an automatic speech recognition (ASR) dictation application, the method comprising:
- receiving, via a user interface useable for instructing a user how to dictate desired text to obtain a desired ASR result, a desired textual expression inputted by the user;
- determining a speech sequence that, when provided as a speech input to the ASR dictation application, would be recognized using ASR such that the desired textual expression is output as an ASR transcription of the speech sequence, and
- outputting the speech sequence in a textual format for presentation via the user interface, to instruct the user that the speech sequence, when provided as a speech input to the ASR dictation application, will result in the desired textual expression being generated as an ASR recognition result.

10. The method of claim 9, wherein the desired textual expression is inputted by the user via the user interface as a selection from within a passage of text containing the desired textual expression.

11. The method of claim 9, wherein the desired textual expression is a correction by the user that replaces another textual expression previously output by the ASR dictation application.

12. The method of claim 9, wherein the user interface is provided via at least one display.

13. The method of claim 9, wherein the instructing of the user comprises outputting the speech sequence in an audio format as synthesized speech via an audio output device.

14. The method of claim 9, wherein the speech sequence is output via the user interface as part of a listing a plurality of speech sequences, different from each other, each of which could cause the ASR dictation application to output the desired textual expression as an ASR recognition result when recognized using ASR.

15. The method of claim 14, further comprising, for a first speech sequence of the plurality of output speech sequences, providing to the user, via the user interface, an indication of at least one parameter setting required to cause the ASR dictation application to output the desired textual expression as an ASR recognition result when the first speech sequence is recognized by the ASR dictation application.

16. The method of claim 14, further comprising, for a first speech sequence of the plurality of output speech sequences, providing to the user, via the user interface, a selectable option to update at least one parameter setting required to cause the ASR dictation application to output the desired textual expression as an ASR recognition result when the first speech sequence is recognized using ASR.

17. At least one non-transitory computer-readable storage medium storing computer-executable instructions that, when executed, perform a method for instructing a user how to dictate to an automatic speech recognition (ASR) dictation application, the method comprising:
- receiving, via a user interface useable for instructing a user how to dictate desired text to obtain a desired ASR result, a desired textual expression inputted by the user;
- determining a speech sequence that, when provided as a speech input to the ASR dictation application, would be recognized using ASR such that the desired textual expression is output as an ASR transcription of the speech sequence and
- causing the speech sequence to be outputted in a textual format for presentation via the user interface, to instruct the user that the speech sequence, when provided as a speech input to the ASR dictation application, will result in the desired textual expression being generated as an ASR recognition result.

18. The at least one non-transitory computer-readable storage medium of claim 17,
- wherein the speech sequence is output via the user interface as part of a listing a plurality of speech sequences, different from each other, each of which could cause the ASR dictation application to output the desired textual expression as an ASR recognition result when recognized using ASR, and
- wherein the method further comprises, for a first speech sequence of the plurality of output speech sequences, providing an indication of at least one parameter setting required to cause the ASR dictation application to output the desired textual expression as an ASR recognition result when the first speech sequence is recognized using ASR.

\* \* \* \* \*